United States Patent
Harper et al.

(10) Patent No.: US 9,548,077 B1
(45) Date of Patent: Jan. 17, 2017

(54) DETECTING AND COMPENSATING FOR EXTERNAL VIBRATION IN A TAPE DRIVE

(71) Applicant: International Business Machines Corporation, Armonk, NY (US)

(72) Inventors: David H. F. Harper, Vail, AZ (US); David L. Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/961,758

(22) Filed: Dec. 7, 2015

(51) Int. Cl.
- *G11B 33/08* (2006.01)
- *G11B 20/10* (2006.01)
- *G11B 5/455* (2006.01)
- *G11B 5/592* (2006.01)
- *G11B 5/008* (2006.01)

(52) U.S. Cl.
CPC ..... *G11B 20/10046* (2013.01); *G11B 5/00813* (2013.01); *G11B 5/455* (2013.01); *G11B 5/5921* (2013.01)

(58) Field of Classification Search
CPC ........... G11B 15/43; G11B 5/584; G11B 5/58; G11B 33/08; G11B 25/043; G11B 33/121
USPC ................. 360/71, 75, 77.12, 78.02, 79, 83, 76, 360/97.19
See application file for complete search history.

(56) References Cited

U.S. PATENT DOCUMENTS

| | | | |
|---|---|---|---|
| 5,602,688 A | 2/1997 | Yokoyama et al. | |
| 6,831,801 B2 * | 12/2004 | Chliwnyj | G11B 15/43 242/334.4 |
| 6,839,197 B2 * | 1/2005 | Chliwnyj | G11B 5/584 360/77.12 |
| 7,623,318 B1 * | 11/2009 | Chliwnyj | G11B 5/584 360/77.12 |
| 8,699,174 B2 | 4/2014 | Kinney et al. | |
| 9,202,496 B2 * | 12/2015 | Supino | G11B 5/58 |
| 2003/0156344 A1 * | 8/2003 | Chliwnyj | G11B 15/43 360/71 |
| 2005/0111131 A1 | 5/2005 | Anderson et al. | |
| 2008/0100953 A1 | 5/2008 | Sosseh et al. | |
| 2009/0244773 A1 | 10/2009 | Nibarger et al. | |
| 2013/0194691 A1 | 8/2013 | Hara et al. | |
| 2014/0355153 A1 | 12/2014 | Goker et al. | |

OTHER PUBLICATIONS

Kim et al., "Track following Control with DFT Estimator for Eccentric Error Compensation of Optical Disk Driver," IEEE Transactions on Consumer Electronics, vol. 53, Issue 2, May 2007, pp. 467-473.

(Continued)

*Primary Examiner* — Nabil Hindi
(74) *Attorney, Agent, or Firm* — Zilka-Kotab, PC

(57) ABSTRACT

In one general embodiment, a computer-implemented method includes using, by the computer, a tape head and/or an actuator to detect the presence of external vibration. The method also includes selecting, by the computer, at least one frequency of interest, and using, by the computer, a discrete Fourier transform implemented as a Goertzel filter to determine a magnitude of the external vibration at the at least one frequency of interest. Compensation may optionally be applied to reduce an effect of the external vibration.

20 Claims, 11 Drawing Sheets

(56) References Cited

OTHER PUBLICATIONS

Luo et al., "Pre-Filtering and Head-Dependent Adaptive Feed-Forward Compensation for Linear Vibration in Hard-Disc-Drive," 2012 American Control Conference, Jun. 27-29, 2012, pp. 1967-1972.

Wikipedia, "Goertzel algorithm," https://en.wikipedia.org/wiki/Goertzel_algorithm, retrieved Oct. 13, 2015, 8 pages.

\* cited by examiner

DETECTING AND COMPENSATING FOR EXTERNAL VIBRATION IN A TAPE DRIVE

BACKGROUND

The present invention relates to data storage systems, and more particularly, this invention relates to detecting and compensating for the effects of external vibration on tape drives.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

A computer-implemented method according to one embodiment includes using, by the computer, a tape head and/or an actuator to detect the presence of external vibration. The method also includes selecting, by the computer, at least one frequency of interest, and using, by the computer, a discrete Fourier transform implemented as a Goertzel filter to determine a magnitude of the external vibration at the at least one frequency of interest.

A system according to one embodiment includes a processor and logic integrated with and/or executable by the processor, the logic being configured to cause performance of the foregoing method.

A computer program product according to one embodiment includes a computer readable storage medium having program instructions embodied therewith, the program instructions readable and/or executable by a controller to cause the controller to perform the foregoing method. Program instructions are also provided to cause the controller to determine, by the controller, whether the magnitude of the external vibration exceeds a threshold at each of the at least one frequency of interest; and apply, by the controller, compensation to reduce an effect of the external vibration in response to determining that the magnitude of the external vibration exceeds the threshold at any of the at least one frequency of interest.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. For example, various processes for compensating for the effects of external vibration on tape drives are disclosed. In some approaches, upon detecting vibration, a frequency or frequencies particular to the drive itself may be examined to determine whether the external vibration is adversely affecting the drive, and if so, compensation may be applied to reduce the effect of the external vibration on the drive.

In one general embodiment, a computer-implemented method includes using, by the computer, a tape head and/or an actuator to detect the presence of external vibration. The method also includes selecting, by the computer, at least one frequency of interest, and using, by the computer, a discrete Fourier transform implemented as a Goertzel filter to determine a magnitude of the external vibration at the at least one frequency of interest.

In another general embodiment, a system includes a processor and logic integrated with and/or executable by the processor, the logic being configured to cause performance of the foregoing method.

In yet another general embodiment, a computer program product includes a computer readable storage medium having program instructions embodied therewith, the program instructions readable and/or executable by a controller to cause the controller to perform the foregoing method. Program instructions are also provided to cause the controller to determine, by the controller, whether the magnitude of the external vibration exceeds a threshold at each of the at least one frequency of interest; and apply, by the controller, compensation to reduce an effect of the external vibration in response to determining that the magnitude of the external vibration exceeds the threshold at any of the at least one frequency of interest.

Figure 1A:
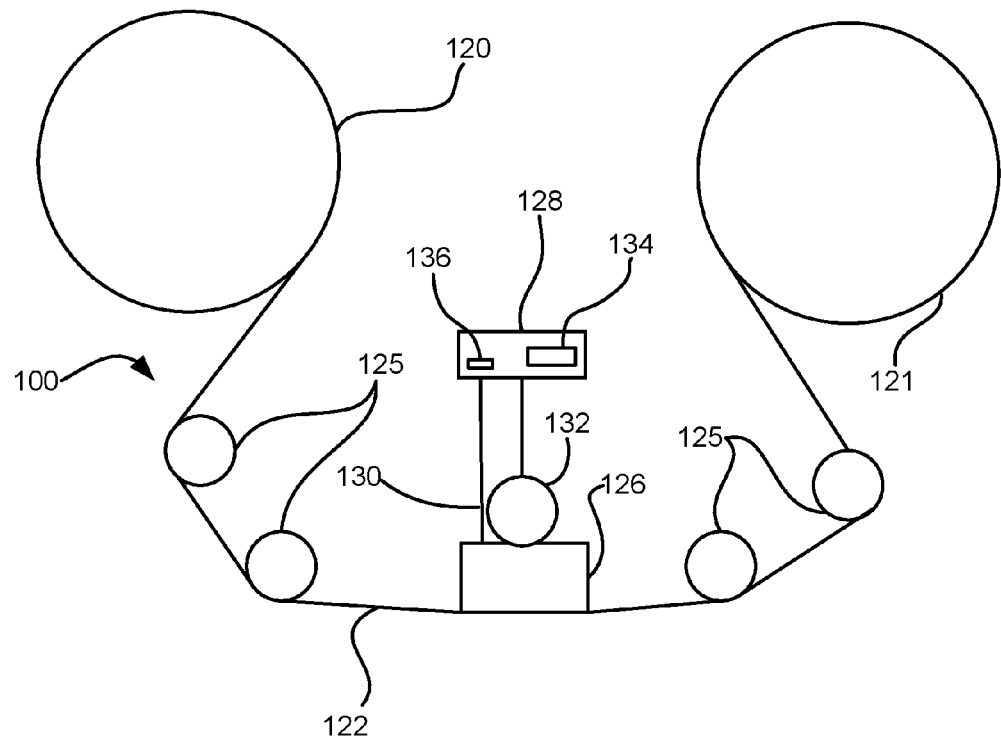
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
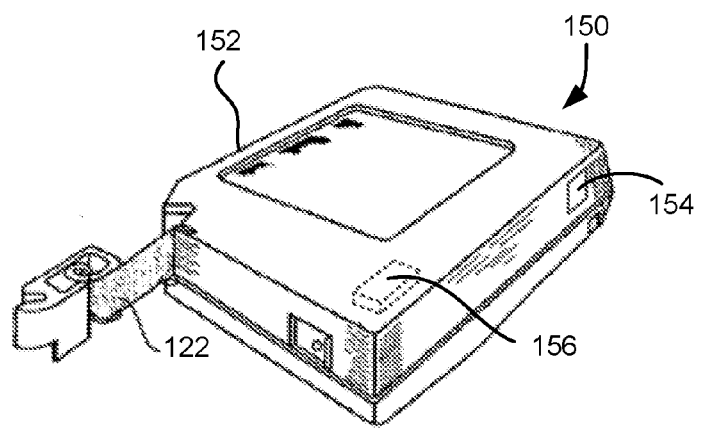
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
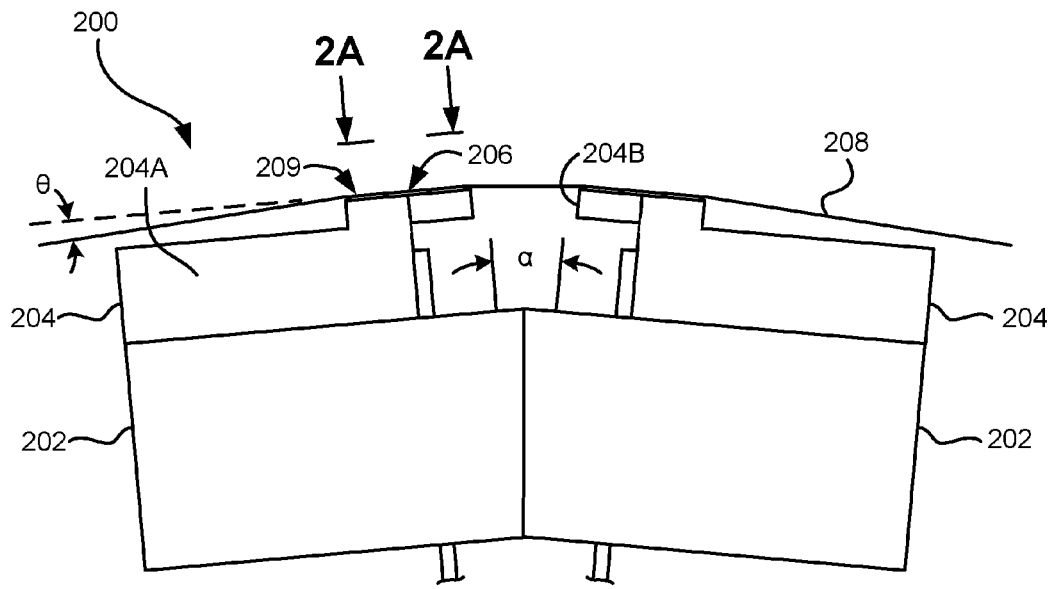
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
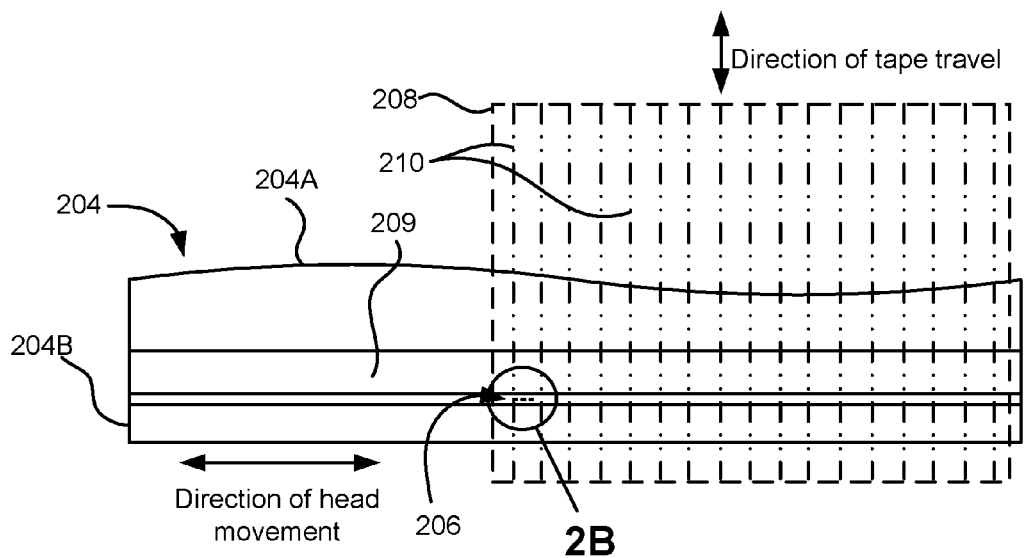
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
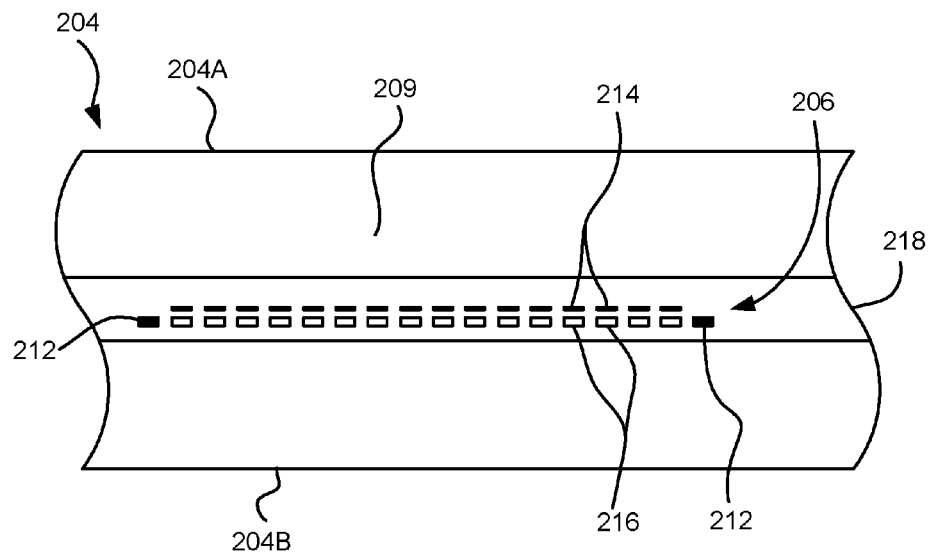
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
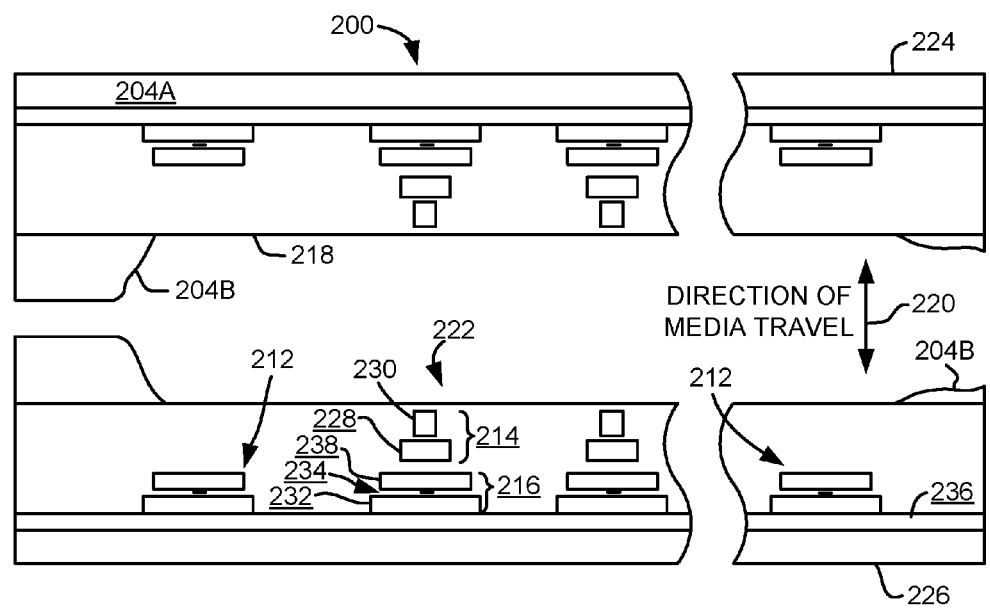
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
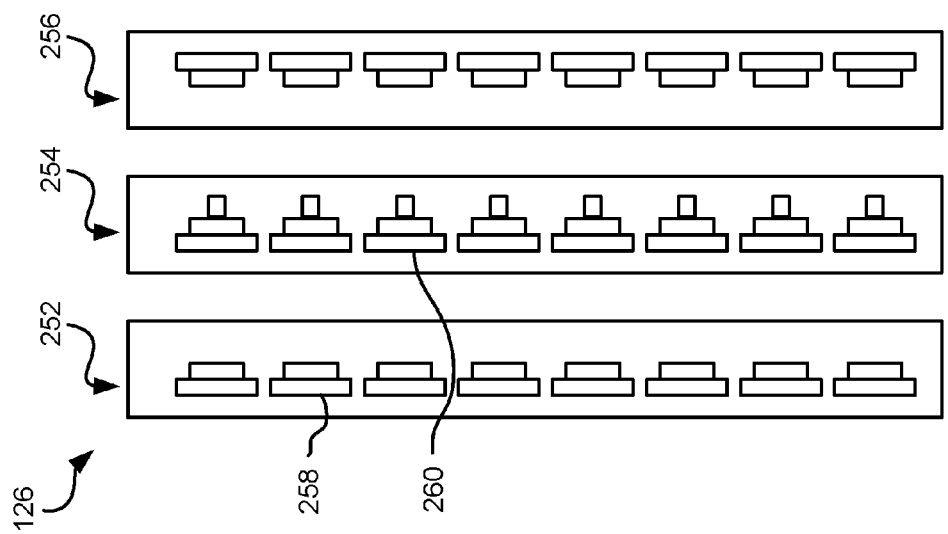
FIG. 4 is a partial tape bearing surface view of a magnetic head having a read-write-read configuration.
Figure 3:
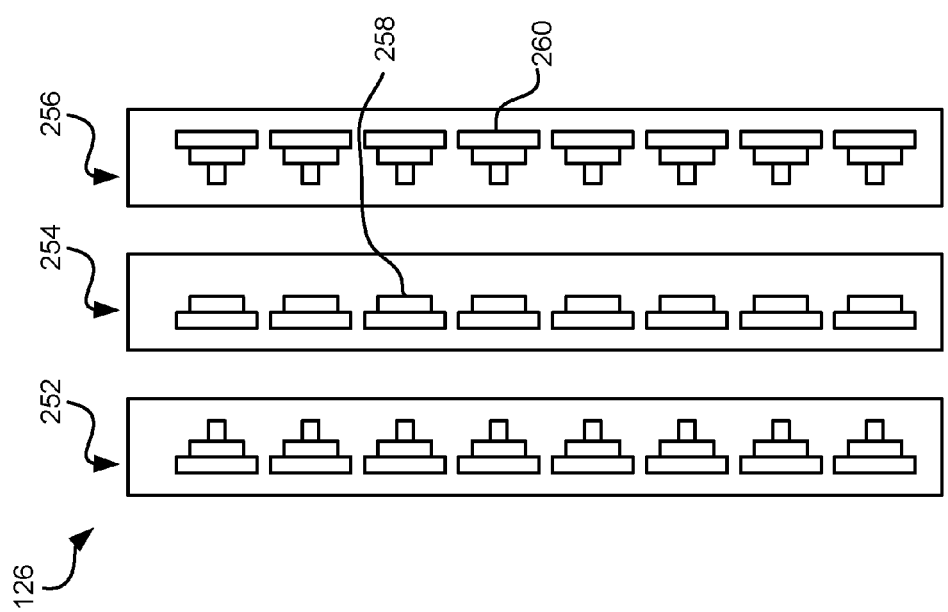
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
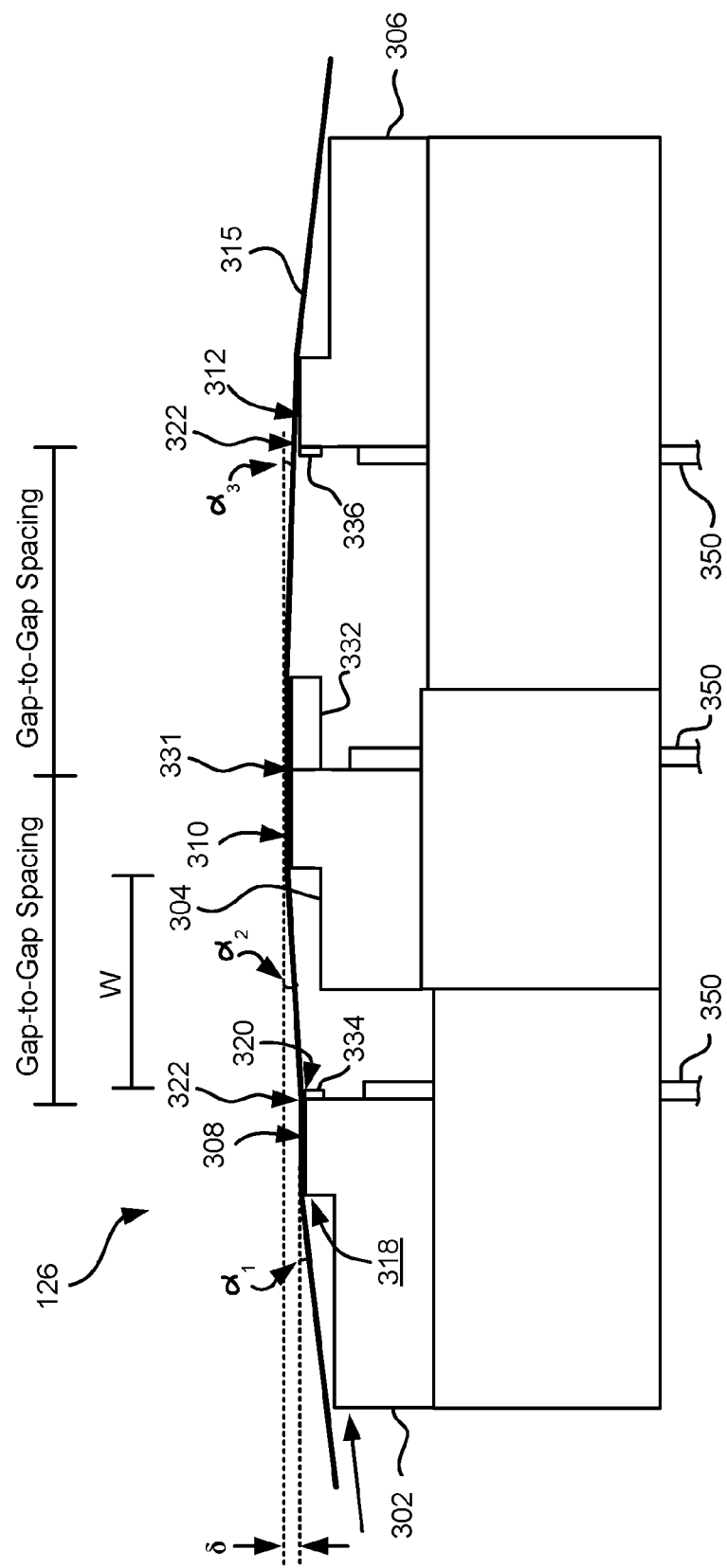
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
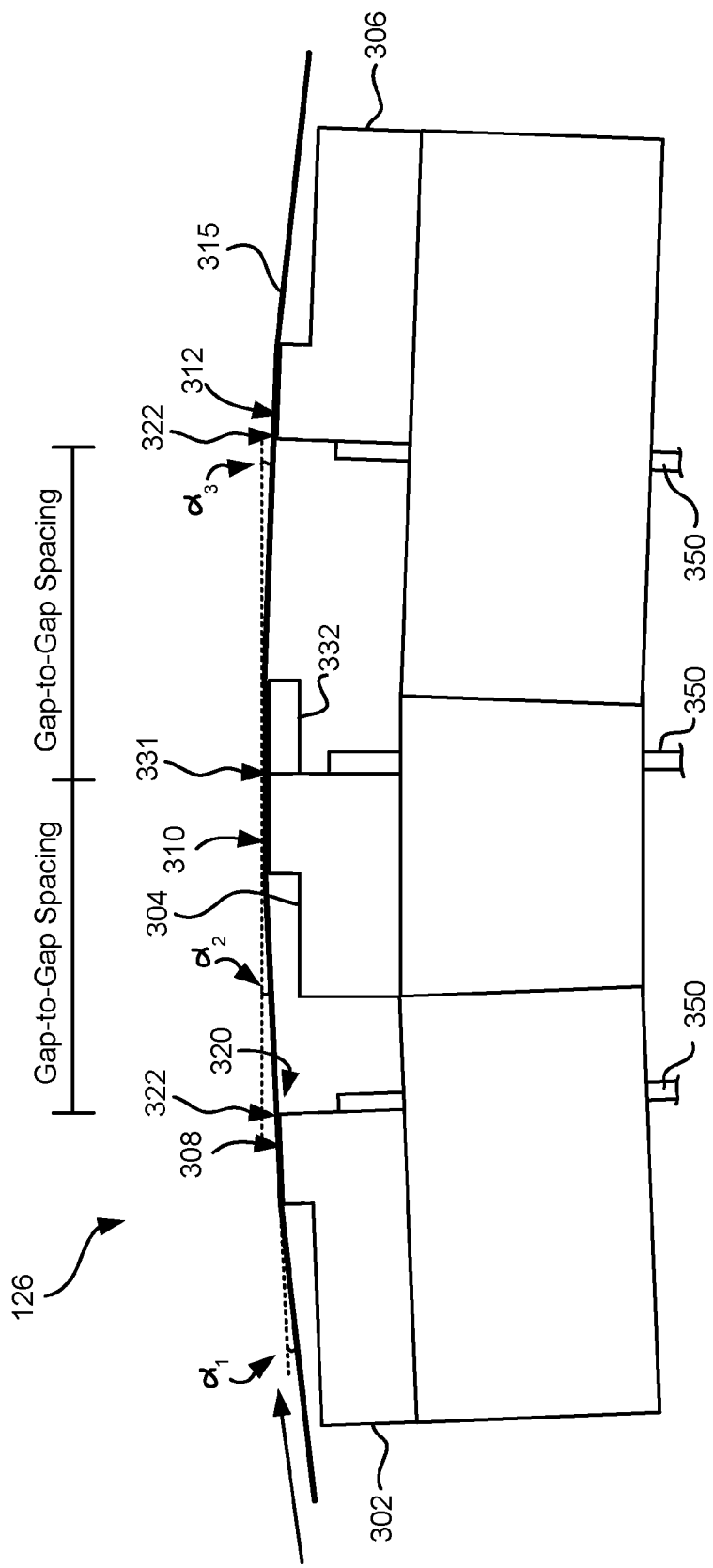
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
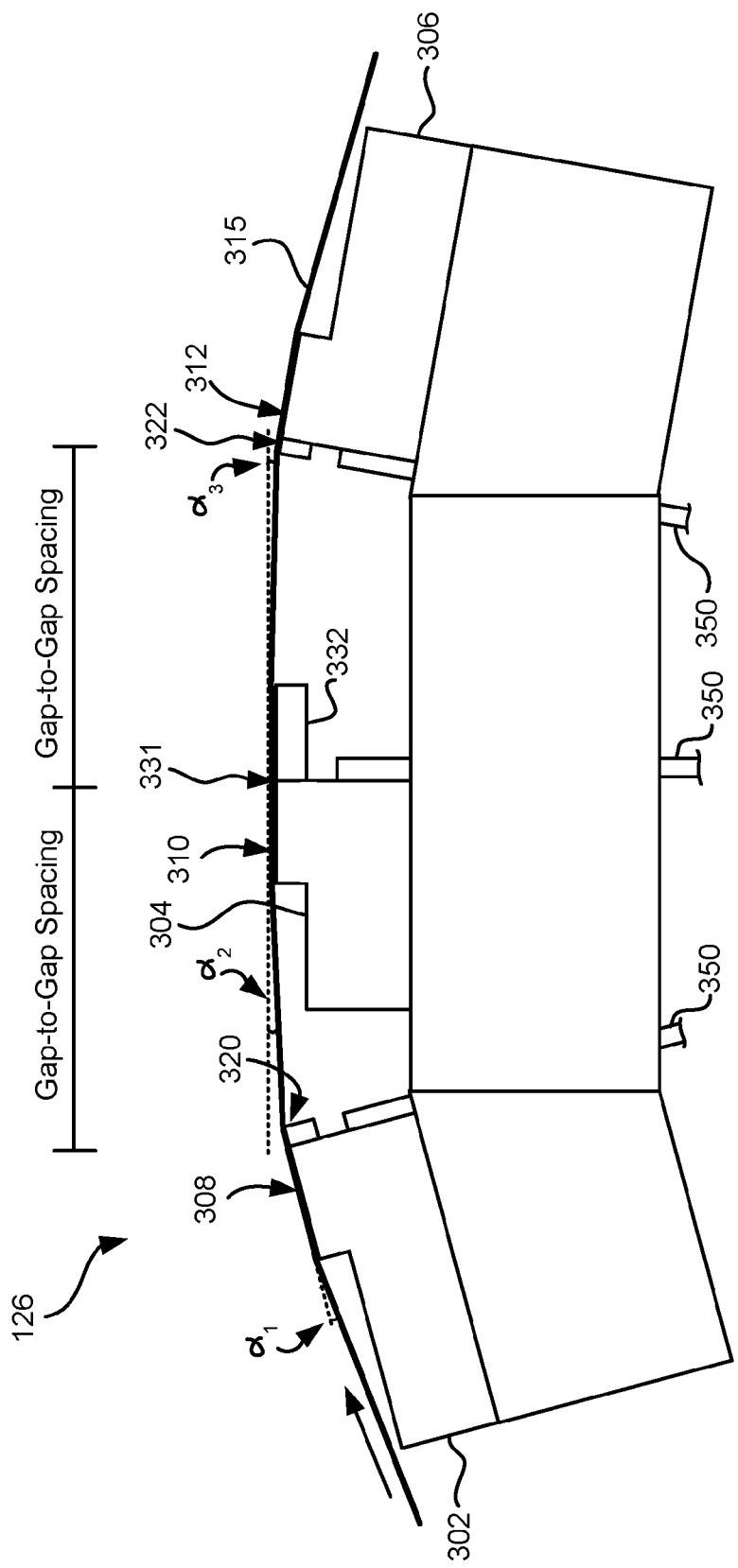
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Tape drives may be implemented in a variety of environments depending on their use. Accordingly, tape drives may be subject to external vibrations, e.g., as a result of being operated in a vibrating environment, such as the hold of an ocean-going vessel. In some cases, the vibration can degrade the operational performance of the tape drive by making it more difficult for the tape drive to adequately position a head relative to the position of a magnetic medium being read from and/or written to, e.g., using an actuator of the drive.

Previous attempts to mitigate these undesirable effects included the use of an accelerometer to detect when external stimuli had a notable effect on drive performance and/or quantify such effects. However, many tape drives do not include accelerometers, nor possess the ability to add such a component. Thus, many tape drives lack the ability to compensate for the effects of external excitations, e.g., vibration.

In sharp contrast to the aforementioned attempts, various embodiments described herein may be able to detect the presence, and preferably magnitude, of external vibrations occurring in three dimensions. Moreover, some of the embodiments described herein may be able to counteract such external vibrations, thereby achieving improved drive performance for external vibrational environments without sacrificing efficiency in other environments.

Figure 8:
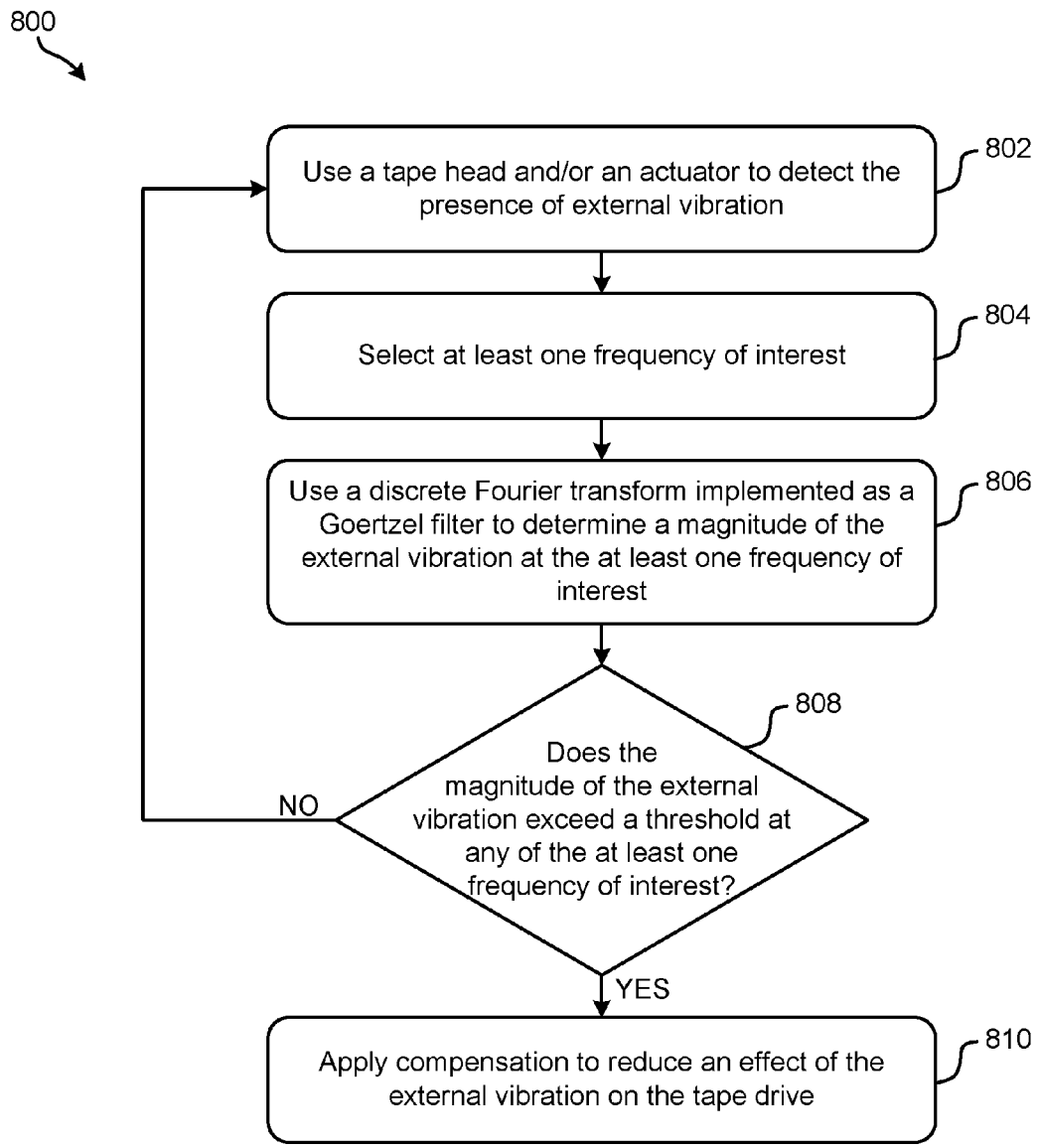
FIG. 8 is a flowchart of a method according to one embodiment.

Referring now to FIG. 8, a flowchart of a method 800 is shown according to one embodiment. The method 800 may be performed in accordance with the present invention in any of the environments depicted in FIGS. 1A-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a controller, a processor, a computer, etc., or some other device having one or more processors therein. Thus, in some embodiments, method 800 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module (s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, operation 802 of method 800 includes using a tape head and/or an actuator to detect the presence of external vibration, e.g., relative to a tape drive. Referring momentarily to FIG. 1A, tape head 126 and/or actuator 132 may be used to detect the presence of external vibration relative to tape drive 100. For example, the presence of external vibrations may be detected by examining (e.g., monitoring mathematically) a position error signal (PES) and/or performance of the actuator. In other approaches, a signal received by the tape head and/or an actuator may be used to detect the presence of external vibration. For example, a signal received from a seismometer positioned in and/or near a tape drive may be used to detect the presence of external vibration. Moreover, a compensator may be used to detect the additional vibration energy present throughout a frequency spectrum resulting from an external vibration condition.

Tape drives may react differently to certain stimuli. For instance, external vibrations may have a specific effect on a tape drive at certain frequencies, e.g., depending on a construction of the drive, structural resonances of the drive, a mass of the drive, components included in the drive, an amplitude of the external vibrations, dimensions of the tape drive, natural frequency of the tape drive, etc. According to an example, components included in a tape drive (e.g., shock mount springs) may resonate at a certain frequency, thereby making the tape drive predisposed to the effects of external vibrations tuned to that certain frequency. Thus, it may be desirable to determine which frequencies of external vibration a given tape drive is susceptible to being affected by when exposed thereto. Such frequencies may be identified as frequencies of interest for the tape drive, and may be stored for future use (e.g., see operation 806 below).

In some approaches, frequencies of interest may be experimentally derived from the performance of a tape drive in which the tape head is positioned when excited under different conditions. After being built, a tape drive may be subjected to excitations at a wide range of frequencies and amplitudes. Those frequencies which illicit a significant enough effect in the tape drive may be identified as a frequency of interest. Moreover, a certain vibration amplitude may be identified at each of the frequencies of interest, identifying a threshold above which compensation is preferably enacted (e.g., see operation 810 below). It should be noted that, as used herein, "above a threshold" is in no way intended to limit the invention. Rather than determining whether a value is above a threshold, equivalent determinations may be made, e.g., as to whether a value is within a predetermined range, having a value outside a predetermined range, having an absolute value above a threshold, having a value below a threshold, etc., depending on the desired approach.

It should be noted that, rather than experimentally derive frequencies of interest for each individual tape drive, frequencies of interest experimentally derived from a given tape drive may be applied to tape drives having similar components and/or dimensions. It follows that in some approaches, frequencies of interest may be experimentally derived from a test tape drive and then applied to similar tapes drives currently in use. According to an example, frequencies of interest may be determined for a given tape drive and then applied to all tape drives in the same production line, e.g., all tape drives having the same model number.

In other approaches, frequencies of interest may be calculated (determined) using physical dimensions of the tape drive and/or components of the tape drive and/or a tape drive similar to the tape drive in which the tape head is positioned. As alluded to above, one or more of the construction of a drive, components included in a drive, dimensions of a drive, the natural frequency of a drive, etc. may be analyzed to determine anticipated frequencies of interest for the drive.

It follows that frequencies of interest derived from experimentation may be determined after the drive has been formed (e.g., manufactured). Moreover, frequencies of interest derived from analysis may be determined before and/or after the drive has been formed. Further still, frequencies of interest may be derived from analysis conducted before the drive is formed and compared with frequencies of interest derived from experimentation after the drive has been formed.

Accordingly, method 800 further includes selecting at least one frequency of interest which corresponds to the drive. See operation 804. After being built, a tape drive may be subjected to excitations at a wide range of frequencies and amplitudes. As mentioned above, a given tape drive may be prone to being effected by certain frequencies of external vibration. Those frequencies which illicit a significant enough effect in the tape drive may be identified as a frequency of interest. Moreover, a certain vibration amplitude may be identified at each of the frequencies of interest, identifying a threshold above which compensation is preferably enacted (e.g., see operation 810 below). Thus, depending on the number of frequencies of interests that have been identified for a given tape drive, one or more, two or more, three or more, four, five, six, eight, ten, multiple, etc. frequencies of interest may be selected for analysis as will soon become apparent.

Operation 806 includes using a discrete Fourier transform (DFT) implemented as a Goertzel filter to determine a magnitude of the external vibration at each of the at least one frequency of interest. When frequencies of interest are known for a given tape drive, those specific frequencies may be searched for and specifically examined using a DFT implemented as a Goertzel filter. As will be appreciated by one skilled in the art, a Goertzel filter may be tuned to a specific frequency. Thus, the DFT may function as a simple digital filter that is designed to only respond to the particular frequency to which the Goertzel filter is tuned, thereby ignoring other frequencies (e.g., energy levels). The relationship between external vibration and the perceived magnitude of the result of the Goertzel filter serves as a strong correlation, and therefore may serve as a desirable use in determining different drive behaviors in the presence or absence of external vibration.

During operation of the tape drive, track following is being performed, and therefore the magnetic tape head is evaluating the PES from the tape, e.g., enacting movement to ensure proper alignment between the magnetic head and the tape. However, by using the Goertzel filter(s), all tape motion may be removed from the determination made in operation 806, whereby only the frequencies of interest introduced from external vibration are evaluated. Each time the drive locks to track, the Goertzel filter(s) may be run.

After the filter is run for a brief period of time, the filter may be stopped, and the results analyzed (e.g., in real time) to determine whether energy is present at the specified frequencies of interest or not. In response to determining that energy is present at a specified frequency of interest, a magnitude of the external vibration at the specified frequency may be determined, e.g., to measure the energy present. According to an exemplary approach, determining the magnitude of the external vibration at each of the frequencies of interest includes using the Goertzel filter to evaluate a PES as a function of the external vibration.

Figure 9A:
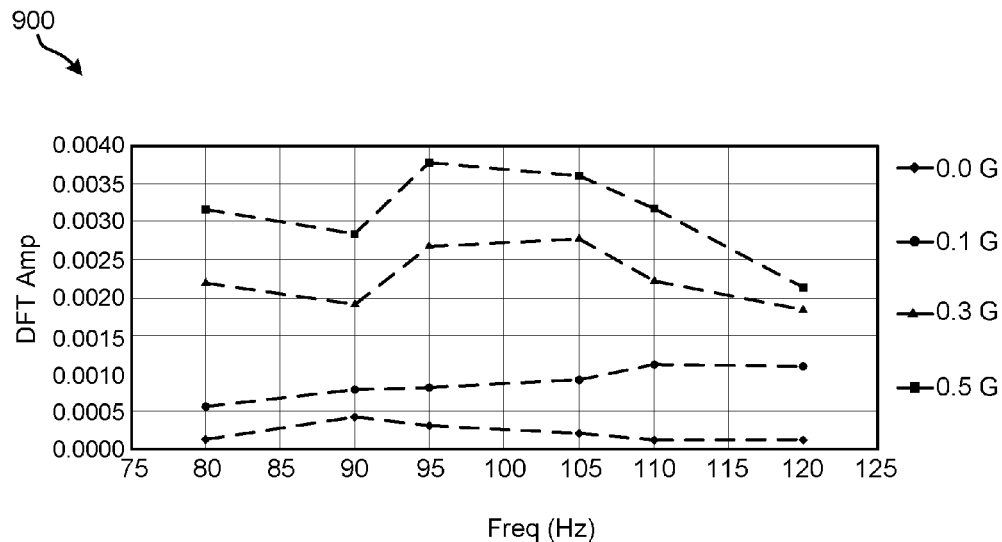
FIG. 9A is a graph of showing plots of amplitude vs. frequency for a tape drive according to one embodiment which has been subjected to different levels of excitation.
Figure 9B:
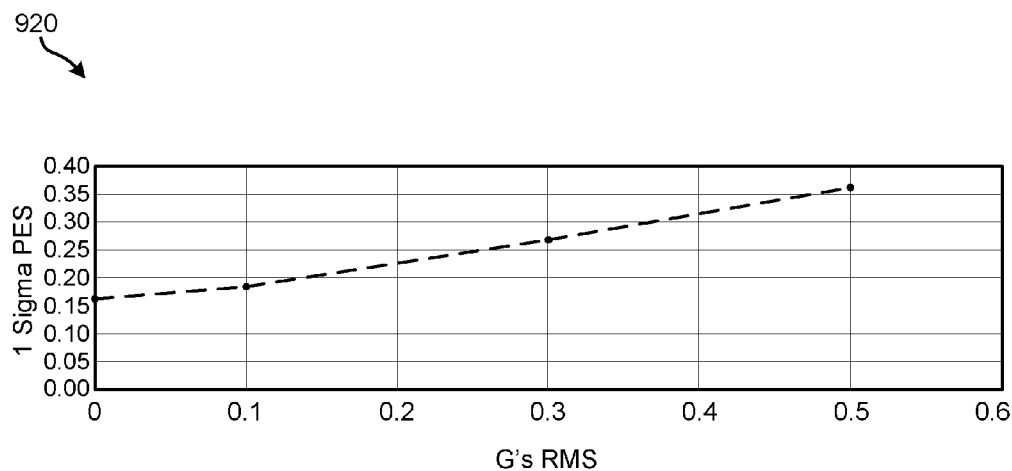
FIG. 9B is a graph which plots the position error signal vs. a level of excitation for a tape drive according to one embodiment.

Referring momentarily to FIGS. 9A-9B, graphs 900, 920 illustrate experimental results corresponding to a tape drive according to one embodiment, where Hz refers to Hertz, PES refers to position error signal, and RMS refers to root mean square. As shown in graph 900, external vibration affects the tape drive at different amplitudes (magnitudes) for each of the frequencies of interest. According to the present embodiment, the frequencies of interest included 80 Hz, 90 Hz, 95 Hz, 105 Hz, 110 Hz and 120 Hz. Moreover, as the force of excitation with respect to gravity (G) increases, the amplitudes at which the drive is effected by the external vibration increases at an about constant relative rate also across the different frequencies of interest. Accordingly, the plots in graph 900 follow a similar pattern, e.g., depending on the performance of the tape drive's actuator. Furthermore, looking to FIG. 9B, graph 920 illustrates the rising PES values relative to each of the increasing forces of excitation with respect to G seen in graph 900.

Figure 9C:
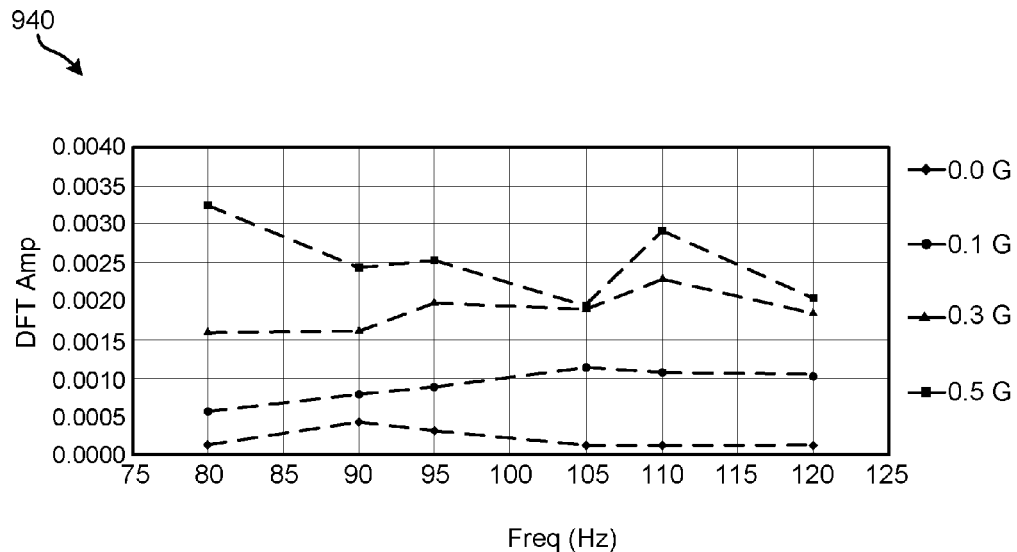
FIG. 9C is a graph of showing plots of amplitude vs. frequency for a tape drive according to one embodiment which has been subjected to different levels of excitation.
Figure 9D:
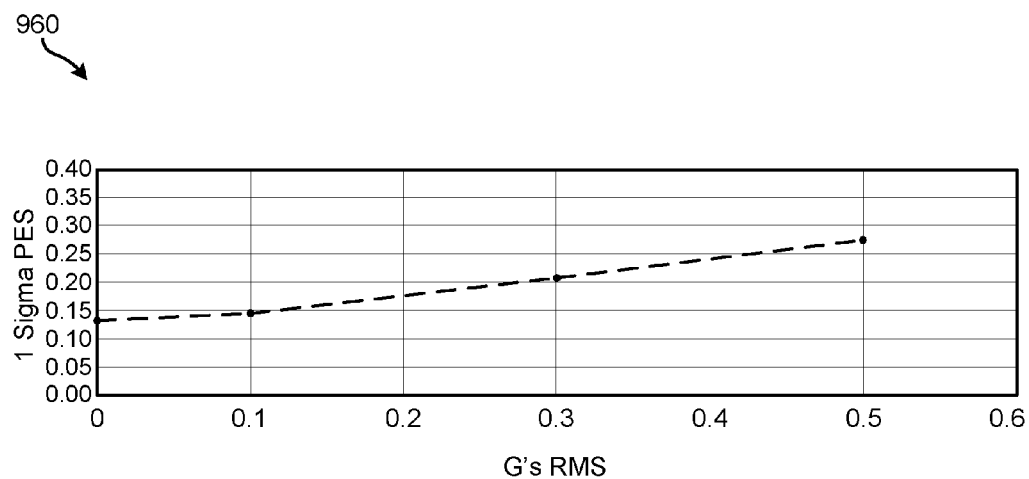
FIG. 9D is a graph which plots the position error signal vs. a level of excitation for a tape drive according to one embodiment.

Similar experimental results are also presented in the graphs 940, 960 of FIGS. 9C-9D. FIG. 9C illustrates that, as the force of excitation with respect to G increases, the DFT amplitudes at which the drive is effected by the external vibration increases at an about constant relative rate also across the different frequencies of interest of 80 Hz, 90 Hz, 95 Hz, 105 Hz, 110 Hz and 120 Hz. Accordingly, the plots in graph 940 again follow a similar pattern, e.g., depending on the performance of the tape drive's actuator. Furthermore, looking to FIG. 9D, graph 960 illustrates the rising PES values relative to each of the increasing forces of excitation with respect to G, as seen in graph 940.

As mentioned above, a vibration amplitude may be identified at each of the frequencies of interest which quantifies a threshold above which compensation is preferably enacted. At this point, a decision may be made as to whether adjustment to the overall behavior of the system is desired, e.g., to resist the external vibration or not. Thus, with continued reference to FIG. 8, method 800 may further include determining whether the magnitude of the external vibration exceeds a threshold at each of the at least one frequency of interest. See decision 808. According to different embodiments, the threshold amplitudes corresponding to each of the frequencies of interest may be calculated in real time, predetermined, set by a user, etc.

As shown, method 800 returns to operation 802 in response to determining that the magnitude of the external vibration does not exceed a threshold at any of the at least one frequency of interest. Thus, continued monitoring of conditions external to the drive may be performed to determine whether additional external vibration is present. However, it should be noted that in other approaches, method 800 may return to operation 804 in response to determining that the magnitude of the external vibration does not exceed a threshold at any of the at least one frequency of interest. For example, a drive may have more frequencies of interest than can be evaluated concurrently at a given time. Therefore, a second set of frequencies may be selected for evaluation on a second pass. In still other approaches, method 800 may simply continue to follow a normal operation procedure if the external vibration is not great enough across all frequencies of interest, e.g., until a subsequent code interval, whereby method 800 may be initiated again.

Looking again to decision 808, method 800 proceeds to operation 810 in response to determining that the magnitude of the external vibration does exceed a threshold for any of the at least one frequency of interest. According to an example, method 800 may proceed to operation 810 in response to determining that the magnitude of the external vibration at one or more of the eight total frequencies of interest exceeds a threshold.

Operation 810 includes applying compensation to reduce an effect of the external vibration on the tape drive. As mentioned above, a vibration amplitude may be identified at each of the frequencies of interest, identifying a threshold above which compensation is preferably enacted. Threshold vibration amplitudes may vary for different frequencies of vibration. According to an example, which is in no way intended to limit the invention, lower thresholds may be implemented for higher frequencies while higher thresholds may be implemented for lower frequencies. However, thresholds may also vary depending on the construction, features, dimensions, etc. of the tape drive itself.

According to various embodiments, compensation may be applied by adjusting the performance of a compensator corresponding to the tape drive, increasing the sensitivity of an actuator of the tape drive, double-checking the data with the PES and/or ECC data, reducing the tape speed, etc., and/or combinations thereof.

As a result, the compensation may overcome the effects of external vibration on the drive at lower overhead in terms of processor power. Implementing a Goertzel filter uses very little bandwidth and may not adversely affect other processes taking place in the drive. However, it should be noted that although applying compensation desirably reduces and/or resists the effects of external vibration on the tape drive, in some instances the compensation may reduce track following bandwidth. It follows that the type of compensation applied and/or the instances in which compensation is applied may be weighed against the resulting effects on drive performance.

Performing any one or more of the processed described herein may be accomplished using the existing components of a tape drive (e.g., see 100 of FIG. 1A) without the inclusion of additional hardware. Thus, any one or more of the processes described above with respect to method 800 may be performed by a tape drive with the proviso that an accelerometer is not used to detect the presence and/or the magnitude of the external vibration. Rather than use an accelerometer, mathematical monitoring of the PES may be used to determine a given threshold which indicates when implementing compensation is desired as described above. According to some approaches, mathematical monitoring of the PES may be performed using information acquired from a magnetic head and/or actuator system, thereby acting as a sensor for external vibration.

Moreover, in some approaches, frequencies of interest may be experimentally derived from a test tape drive and then applied to similar tapes drives currently in use, as previously mentioned. Thus, in some embodiments, method 800 may further include an optional operation of receiving program instructions at a tape drive from a host, a remote location, etc. The deployed program instructions may be used by the tape drive (e.g., or a controller thereof) to perform any one or more of the processes described above with reference to method 800. For example, the processes illustrated in FIG. 10 may be deployed to one or more tape drives, e.g., at a customer location. According to another example, which is in no way intended to limit the invention, program instructions may be deployed to existing tape drives currently in operation which are similar to a tape drive for which the frequencies of interest and/or threshold amplitudes were determined, again as any one or more of the processed described herein may be performed using the existing components of a tape drive without the inclusion of additional hardware.

It is also preferred that the processes included in FIG. 8 are performed in less than about 50 microseconds each time the method 800 is implemented, but may be higher or lower depending on the desired embodiment.

Servo control may run at fixed intervals, e.g., 50 microsecond intervals in the following example, for some tape drive embodiments, e.g., depending on the task the tape drive is performing at a given point in time. The code that embodies the compensator (which controls the motion and/or position of the tape head) may also operate in this manner. Accordingly, each time code is called in such embodiments, the resulting process is preferably completed within the 50 microsecond interval. A Goertzel filter uses very few clock cycles, and may therefore be easily added within the 50 microsecond code interval window. Moreover, the low number of clock cycles used to run the Goertzel filter allows for more than one filter to be implemented each interval. Thus, according to different approaches, a drive may evaluate at least one, at least two, at least three, four, five, eight, ten, etc. frequencies of interest concurrently in each 50 microsecond interval without any adverse effects to the existing servo code, e.g., depending on the sampling rate, processing power, bandwidth, etc.

However, the processes of method 800 above are preferably performed less frequently, e.g., to preserve functionality. Moreover, conditions in which external vibration is present typically remain constant for at least periods of time longer than a code interval window. It follows that one or more of the processes of method 800 may be performed during lulls, e.g., when tape has stopped moving during a tape mount operation, a change in tape motion direction, a stop/pause in tape operation performance, etc. Thus, implementations of the processes of method 800 may be separated by seconds, minutes, hours, etc., depending on the circumstances. However, it should be noted that any one or more of the processes of method 800 may be performed more or less frequently, depending on the desired embodiment.

However, in some embodiments it may be desirable to implement threshold logic having some level of hysteresis, e.g., to prevent the tape drive from rapidly switching between normal operation procedures and compensation procedures between each code interval window, especially in the event that external vibration is at moderate levels. Accordingly, each time any one or more of the processes of method 800 are performed may be separated by a number of code interval windows, e.g., every other, every third, every fourth, etc.; an amount of time; meeting a predetermined condition; requests; etc., depending on the desired embodiment.

Figure 10:
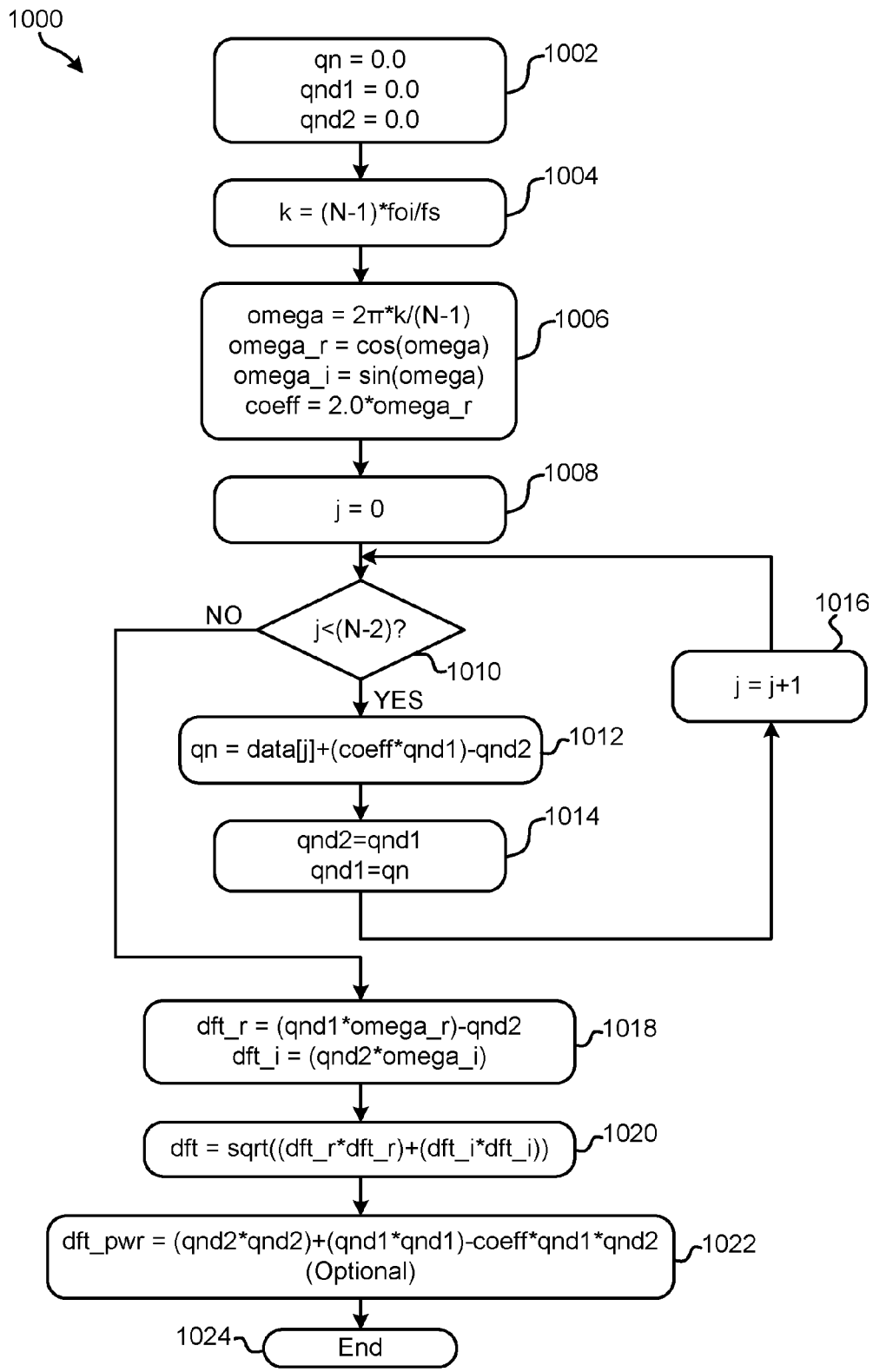
FIG. 10 is a flowchart of a method according to one embodiment.

Looking to FIG. 10, a flowchart of a method 1000 is illustrated according to one embodiment. The method 1000 may be performed in accordance with the present invention in any of the environments depicted in FIGS. 1A-7, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, operation 1002 of method 1000 includes setting variables "qn", "qnd1" and "qnd2" equal to 0.0, e.g., such that each variable is initialized at the outset of method 1000.

Operation 1004 includes calculating a value for the constant "k" by using a desired frequency, e.g., a frequency of interest as described herein. Furthermore, operation 1006 includes setting values for variables "omega", "omega_r", "omega_i" and "coeff" as shown.

Furthermore, operation 1008 sets "j" equal to 0 while decision 1010 determines whether the value of j is less than (N−2). Method 1000 proceeds to operation 1012 in response to determining that the value of j is less than (N−2), where the n'th value of q is calculated. Moreover, operation 1014 includes updating the n−2 and n−1 values according to the equations shown.

Operation 1016 increments the value of j, after which method 1000 returns to decision 1010 which determines whether the incremented value of j is less than (N−2). Method 1000 again performs operations 1012, 1014, 1016 in response to determining that the incremented value of j is less than (N−2). It follows that operations 1012, 1014, 1016 are repeatedly performed (e.g., each time in less than 50 microseconds) for each of the PES samples (data), up to N−2 length samples. Thus, for each concurrent filter, steps 1012, 1014, 1016, 1010 are preferably performed once within each code interval window (e.g., each 50-microsecond window). In other words, the filter will take N−2 code interval windows to complete.

Alternatively, method 1000 proceeds to operation 1018 in response to determining that the incremented value of j is greater than or equal to (N−2). Operation 1018 includes calculating DFT components while operation 1020 includes calculating the DFT at the frequency of interest, thereby producing an amplitude of disturbance (e.g., vibration) at the particular frequency of interest, after which method 1000 may end. See operation 1024. Moreover, optional operation 1022 may be implemented in some approaches which includes calculating the power, e.g., if the sqrt value is not desired. Thus, according to some embodiments, operation 1022 may be implemented rather than operation 1020. It should also be noted that method 1000 may wait to perform operations 1020, 1022 until a "stop time", e.g., when the DFT implemented as a Goertzel filter is stopped such that the results may be evaluated, during a pause in tape motion, when an adequate amount of processing bandwidth is available, etc. During evaluation, the value of "dft" and/or "dft_power" may be used to determine whether compensation for external vibration is desired. If it is determined that compensation is desired, any one or more of the approaches described above may be implemented to reduce the effect of the external vibration on the tape drive.

Again, some of the embodiments herein are desirably able to detect and/or compensate for external vibration without the implementation of a separate accelerometer. Various embodiments described herein may be able to monitor the PES at specific frequencies of interest to determine an amplitude of output at those specific frequencies of interest, and preferably determine whether compensation should be enacted, e.g., by adjusting the performance of a compensator, reducing the speed of tape, etc.

The ability to reliably detect external vibration having an effect on the performance of a tape drive using the existing components of the tape drive, e.g., without the inclusion of additional hardware is desirable, as it reduces hardware complexity and associated costs. By utilizing Goertzel filters (algorithms), various embodiments described herein are desirably able to determine the amplitude of external vibration (disturbances) and apply compensation (e.g., scaling values) to attenuate the effects of such vibration. As previously mentioned, the relationship between external vibration and the perceived magnitude of the result of the Goertzel filter serves as a strong correlation, and therefore may serve as a desirable use in determining different drive behaviors of a tape drive in the presence or absence of external vibration. Moreover, one or more of the processes described herein may be used to observe other frequencies (e.g., resonances of other components, harmonic frequencies, etc.), observe other energy concurrently, creating double-checks and/or fail-safes within the detection logic of certain embodiments, etc., as would be appreciated by one skilled in the art upon reading the present description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
   using, by the computer, a tape head and/or an actuator to detect the presence of external vibration;
   selecting, by the computer, at least one frequency of interest; and
   using, by the computer, a discrete Fourier transform implemented as a Goertzel filter to determine a magnitude of the external vibration at the at least one frequency of interest.

2. A method as recited in claim 1, wherein the at least one frequency of interest is selected from at least one of: frequencies experimentally derived from a tape drive in which the tape head is positioned, frequencies experimentally derived from a tape drive similar to the tape drive in which the tape head is positioned, and frequencies calculated using physical dimensions of and/or components of the tape drive and/or a tape drive similar to the tape drive in which the tape head is positioned.

3. A method as recited in claim 1, with a proviso that an accelerometer is not used to detect the presence and/or the magnitude of the external vibration.

4. A method as recited in claim 1, wherein detecting the presence of external vibration includes examining a position error signal.

5. A method as recited in claim 1, wherein determining the magnitude of the external vibration at the at least one frequency of interest includes using the Goertzel filter to evaluate a position error signal as a function of the external vibration.

6. A method as recited in claim 1, comprising:
   determining, by the computer, whether the magnitude of the external vibration exceeds a threshold at each of the at least one frequency of interest; and
   applying, by the computer, compensation to reduce an effect of the external vibration in response to determining that the magnitude of the external vibration exceeds the threshold at any of the at least one frequency of interest.

7. A method as recited in claim 1, wherein the computer-implemented operations are performed in less than 50 microseconds.

8. A computer-implemented method, comprising:
   deploying, by the computer, program instructions to a tape drive, the program instructions being for performing the method of claim 1.

9. A system, comprising:
   a processor and logic integrated with and/or executable by the processor, the logic being configured to:
   use a tape head and/or an actuator to detect the presence of external vibration;
   select at least one frequency of interest; and
   use a discrete Fourier transform implemented as a Goertzel filter to determine a magnitude of the external vibration at the at least one frequency of interest.

10. A system as recited in claim 9, wherein the at least one frequency of interest is selected from at least one of: frequencies experimentally derived from a tape drive in which the tape head is positioned, frequencies experimentally derived from a tape drive similar to the tape drive in which the tape head is positioned, and frequencies calculated using physical dimensions of and/or components of the tape drive and/or a tape drive similar to the tape drive in which the tape head is positioned.

11. A system as recited in claim 9, with a proviso that an accelerometer is not used to detect the presence and/or the magnitude of the external vibration.

12. A system as recited in claim 9, wherein detecting the presence of external vibration includes examining a position error signal.

13. A system as recited in claim 9, wherein determining the magnitude of the external vibration at the at least one frequency of interest includes using the Goertzel filter to evaluate a position error signal as a function of the external vibration.

14. A system as recited in claim 9, the logic being configured to:
   determine whether the magnitude of the external vibration exceeds a threshold at each of the at least one frequency of interest; and
   apply compensation to reduce an effect of the external vibration in response to determining that the magnitude of the external vibration exceeds the threshold at any of the at least one frequency of interest.

15. A system as recited in claim 9, wherein the processor is configured to perform the operations in less than 50 microseconds.

16. A system as recited in claim 9, comprising:
   a drive mechanism for passing a magnetic medium over the tape head; and
   a controller electrically coupled to the tape head.

17. A computer program product comprising a computer readable storage medium having program instructions embodied therewith, the program instructions readable and/or executable by a controller to cause the controller to:
  use, by the controller, a tape head and/or an actuator to detect the presence of external vibration;
  select, by the controller, at least one frequency of interest;
  use, by the controller, a discrete Fourier transform implemented as a Goertzel filter to determine a magnitude of the external vibration at the at least one frequency of interest;
  determine, by the controller, whether the magnitude of the external vibration exceeds a threshold at each of the at least one frequency of interest; and
  apply, by the controller, compensation to reduce an effect of the external vibration in response to determining that the magnitude of the external vibration exceeds the threshold at any of the at least one frequency of interest.

18. A computer program product as recited in claim 17, with a proviso that an accelerometer is not used to detect the presence and/or the magnitude of the external vibration.

19. A computer program product as recited in claim 17, wherein the controller is configured to perform the operations in less than 50 microseconds.

20. A computer program product as recited in claim 17, wherein the at least one frequency of interest is selected from at least one of: frequencies experimentally derived from a tape drive in which the tape head is positioned, frequencies experimentally derived from a tape drive similar to the tape drive in which the tape head is positioned, and frequencies calculated using physical dimensions of and/or components of the tape drive and/or a tape drive similar to the tape drive in which the tape head is positioned.

* * * * *